US007008464B2

(12) United States Patent
Deetz

(10) Patent No.: US 7,008,464 B2
(45) Date of Patent: Mar. 7, 2006

(54) DEHYDRATION OF WET GAS UTILIZING INTIMATE CONTACT WITH A RECIRCULATING DELIQUESCENT BRINE

(75) Inventor: Jack A. Deetz, Houston, TX (US)

(73) Assignee: National Tank Company, Houston, TX (US)

( * ) Notice: Subject to any disclaimer, the term of this patent is extended or adjusted under 35 U.S.C. 154(b) by 105 days.

(21) Appl. No.: 10/637,297

(22) Filed: Aug. 8, 2003

(65) Prior Publication Data

US 2005/0028673 A1 Feb. 10, 2005

(51) Int. Cl.
*B01D 53/26* (2006.01)

(52) U.S. Cl. ................. 95/24; 95/95; 95/117; 96/120; 96/151; 96/396; 96/412

(58) Field of Classification Search ............. 95/24, 95/91, 117; 96/118–120, 151, 157, 312, 96/396, 409, 412
See application file for complete search history.

(56) References Cited

U.S. PATENT DOCUMENTS

| | | | | |
|---|---|---|---|---|
| 1,463,279 A | * | 7/1923 | Arnold et al. ............... 95/117 |
| 2,026,936 A | * | 1/1936 | Downs ........................ 95/91 |
| 2,027,094 A | * | 1/1936 | Downs ........................ 95/91 |
| 2,221,786 A | * | 11/1940 | Downs et al. ................ 95/91 |
| 2,804,940 A | * | 9/1957 | Hutchinson ................... 95/91 |
| 2,916,103 A | * | 12/1959 | Daugherty .................. 96/120 |
| 3,170,776 A | * | 2/1965 | Knight et al. ................ 96/120 |
| 3,246,454 A | * | 4/1966 | Norton ....................... 96/118 |
| 3,303,621 A | * | 2/1967 | Hill ............................. 96/119 |
| 3,312,041 A | * | 4/1967 | Hill ............................. 95/91 |
| 3,390,511 A | * | 7/1968 | Norton ........................ 95/91 |
| 3,483,673 A | * | 12/1969 | Wellman ..................... 96/116 |
| 3,511,594 A | * | 5/1970 | Lenz et al. .................. 423/230 |
| 3,653,181 A | * | 4/1972 | Becker ......................... 95/91 |
| 4,749,388 A | * | 6/1988 | Francois ....................... 96/120 |
| 5,766,309 A | * | 6/1998 | Thomas ....................... 95/91 |
| 6,063,163 A | | 5/2000 | Carmody ..................... 95/187 |
| 6,453,576 B1 | * | 9/2002 | Smith et al. .................. 34/343 |
| 6,572,687 B1 | * | 6/2003 | Slaymaker ................... 96/119 |

\* cited by examiner

*Primary Examiner*—Robert H. Spitzer
(74) *Attorney, Agent, or Firm*—Paul H. Johnson; Gable & Gotwals

(57) ABSTRACT

A system for removing moisture from a wet gas stream including a vessel having a contact area containing deliquescing salts that produces brine as water is absorbed, the brine flowing to a collection area in the bottom of the vessel. A venturi positioned in a wet gas inlet stream produces an area of reduced pressure that is applied to a brine flow path connected to the brine collection area. In this way, the brine is recirculated into intimate contact with the wet gas inlet stream causing the brine to be diluted with water extracted from the wet gas stream.

11 Claims, 3 Drawing Sheets

DEHYDRATION OF WET GAS UTILIZING INTIMATE CONTACT WITH A RECIRCULATING DELIQUESCENT BRINE

REFERENCE TO PENDING APPLICATIONS

This application is not related to any pending United States or foreign patent application.

REFERENCE TO MICROFICHE APPENDIX

This application is not referenced in any microfiche appendix.

FIELD OF THE INVENTION

The present invention relates to wet gas dehydration employing deliquescing salts. More particularly, the present invention concerns a system, a method, and an apparatus for dehydrating wet gas using solid deliquescing salts wherein brine produced by dissolved salts is intimately mixed with the incoming wet gas stream to promote water absorption and reduced deliquescent consumption.

BACKGROUND OF THE INVENTION

Natural gas is derived from subterranean formations and, as it occurs in nature, normally contains contaminates, the most common of which is water. Removing entrained water from natural gas substantially decreases the problems of transportation, processing, and ultimate use of the natural gas, such as for purposes of providing heat for homes, heating water, and for multiple industrial applications. Natural gas is one of nature's best sources of energy. Water causes many problems in the transportation and processing of natural gas, including the formation of hydrates and water contributes immeasurably to corrosion in pipelines and in processing equipment.

For these reasons, it is common in the natural gas industry to employ process vessels, systems, and methods for removing water, along with other contaminates, from the natural gas stream that is produced from a subterranean formation. This basic concept is referred to generally as "dehydration" which can be accomplished in multiple ways. One of the methods of dehydration that is particularly effective in producing very dry gas is the use of a desiccant in the form of deliquescing salts. Deliquescence is a process wherein a solid chemical, such as a salt, is dissolved gradually and becomes liquid by attracting and absorbing moisture from gas passing in contact with it. Gas dehydration by the process of deliquescence is well known and frequently used in industry, particularly in applications where a very dry gas is required. Free water entrained in natural gas can be removed in a variety of ways, such as by a hydrocyclone. However, by the process of deliquescence, soluble water can be removed to effectively reduce the dew point.

In the typical application of deliquescence as a dehydration process, a bed of deliquescing salts is provided within a dehydration vessel through which the wet gas passes. As the wet gas contacts the deliquescing salts, water is absorbed from the gas stream. In the process, the salts are dissolved forming a liquid salt solution (brine) that passes downwardly into a lower portion of the vessel. Dry gas having passed through the bed of deliquescing salts is then discharged through a dry gas outlet. The dissolved deliquescing salts (brine) that collect as a liquid are typically in a highly concentrated form. A problem that has been encountered with using deliquescence as a dehydration method is that brine accumulated in the process has a strong tendency to recrystallize—that is, to form solids that are difficult to remove from a treating vessel.

The essence of the invention herein is a method of reducing the recrystallization of the brine and that improves the gas dehydration process by accomplishing these three functions: 1) the brine solution absorbs additional water from the wet gas stream when they contact with sufficient turbulence, theoretically, the brine solution can absorb up to 30% more water; 2) when this water is absorbed from the wet inlet gas stream, the brine solution is no longer saturated and is less likely to crystallize due to process temperature changes; and 3) by using the concentrated brine solution to promote additional water absorption from the wet gas stream, the amount of deliquescing salt required will be reduced by as much as 30%.

BRIEF SUMMARY OF THE INVENTION

The invention herein provides a system, apparatus and method for gas dehydration employing a deliquescence process and in which improved efficiency of the use of deliquescent material is achieved and reduced recrystallization is achieved. The system is for the purpose of removing moisture from a wet gas stream and includes a vessel having a contact area therein containing deliquescing salts. This contact area is typically provided above a horizontal foraminous shelf arranged for gas flow therethrough.

The vessel has a dry gas outlet above the contact area and a brine collection area at the vessel bottom in communication with a brine outlet. A wet gas inlet is provided in the vessel below the contact area. A large recloseable opening is provided in the vessel top for use in replenishing the deliquescing salts.

In this invention, a venturi apparatus is provided in conjunction with the wet gas inlet. The venturi forms an orifice positioned within the wet gas inlet through which the wet gas stream passes, the orifice producing a low pressure area. A siphon tube extends from the orifice low pressure area to the brine collection area. Through this siphon tube, brine is recirculated by venturi effect created by the incoming wet gas stream.

A level control is employed by which the flow of brine through the brine outlet is regulated to thereby regulate the brine level within the brine collection area.

Recirculation of the brine substantially reduces the possibility of the brine recrystallizing into a solid or semi-solid salt by providing intimate contact between the wet gas stream and the brine. More specifically, brine drawn upwardly through the siphon tube is intimately mixed with the incoming wet gas. Mixing of the recycled brine and the incoming wet gas (particularly under turbulent conditions) causes a portion of the water carried in the wet gas to mix with the brine, thereby absorbing water from the wet gas and simultaneously diluting the brine. This additional water absorption improves efficiency of the dehydration process and at the same time dilutes the brine to thereby retard recrystallization.

The method of the invention herein for removing moisture from a wet gas stream employing deliquescence and achieving reduced recrystallization, including the step of introducing the wet gas stream through an orifice into a vessel having a contact area therein that contains deliquescing salts that produce brine as moisture is extracted from the wet gas, potentially results in the absorption of an additional 30% water.

In practicing the system and method of this invention, a gas dehydration contact tower is preferably employed. The contact tower is in the form of an upright vessel having a top and bottom and having in an upper interior portion of the vessel a horizontal shelf that retains deliquescing salts. The vessel further has a dry gas outlet above salt and a brine collection area in a lower interior portion, below the shelf. A venturi forming wet gas inlet in communication with an interior portion of the vessel is provided below the shelf. A siphon tube extends from the venturi forming inlet to the brine collection area through which brine is recycled with the wet gas entering through the wet gas inlet.

A detailed description of the invention follows in conjunction with the attached drawings.

DETAILED DESCRIPTION OF THE PREFERRED EMBODIMENT

Figure 1:
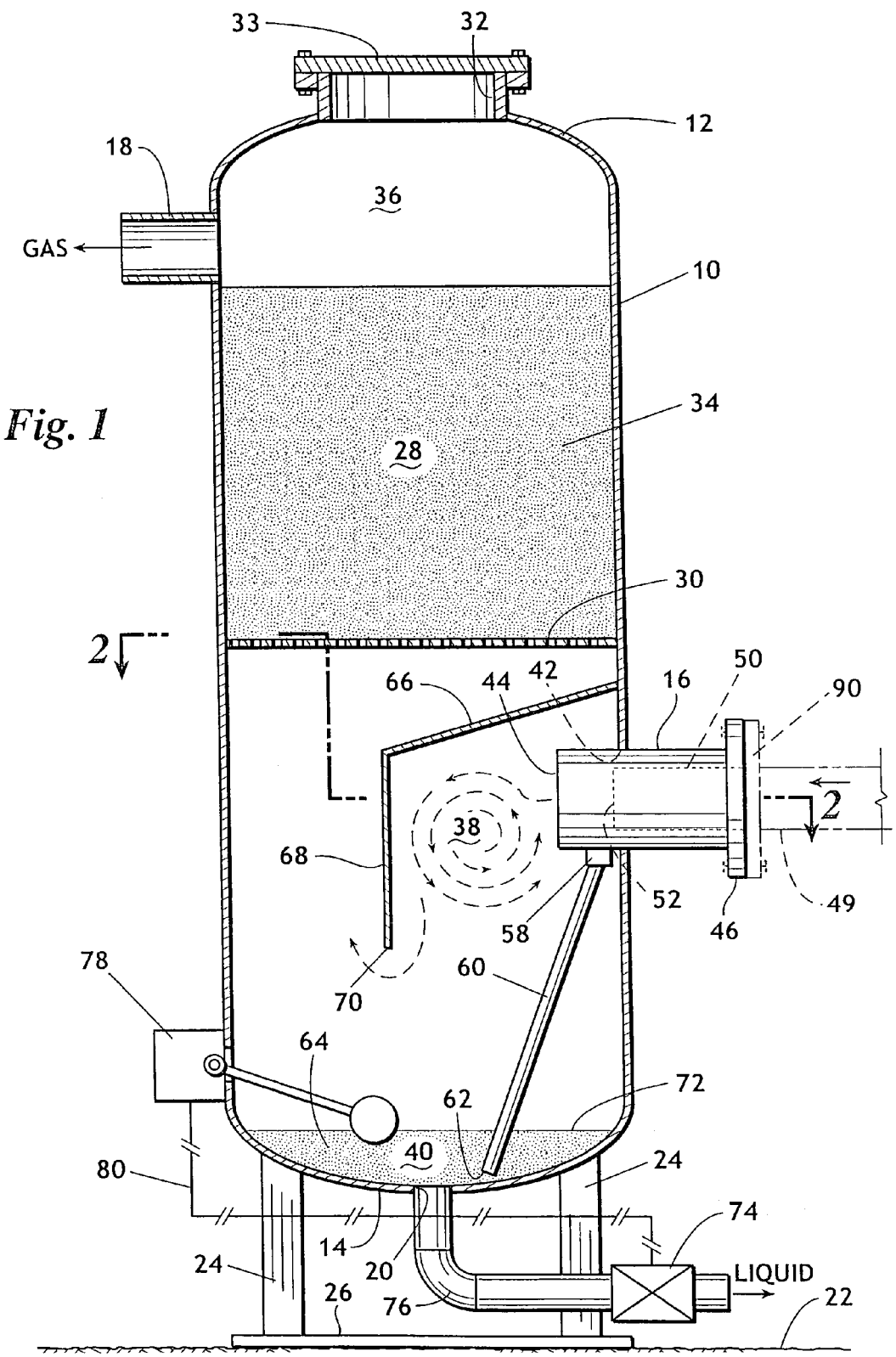
FIG. 1 is an elevational cross-sectional view of an upstanding dehydration contact tower arranged to dehydrate a wet gas stream utilizing a deliquescing salt process and which provides for recycling brine that is produced by the process. The brine recirculation process achieves improved efficiency of water absorption and dilution of the brine to thereby reduce recrystallization of the brine.

Major elements of the invention are indicated in the drawings by numerals as follows:

| (10) | gas contact vessel |
| (12) | Top |
| (14) | Bottom |
| (16) | wet gas inlet tube |
| (18) | dry gas outlet |
| (20) | brine outlet opening |
| (22) | earth's surface |
| (24) | Legs |
| (26) | base plate |
| (28) | contact area |
| (30) | foraminous shelf |
| (32) | access opening |
| (33) | removable cover |
| (34) | deliquescing salts |
| (36) | dry gas collection area |
| (38) | turbulent wet gas inlet area |
| (40) | brine collection area |
| (42) | wet gas inlet opening |
| (44) | outlet end |
| (46) | Flange |
| (48) | circumferential weld |
| (49) | Piping |
| (50) | venturi tube |
| (50A) | modified venturi tube |
| (52) | outlet end |
| (54) | circumferential weld |
| (55) | annular ring |
| (56) | annular area |
| (58) | venturi inlet opening |
| (60) | siphon tube |
| (60A) | alternate siphon tube |
| (62) | lower end |
| (64) | brine solution |
| (66) | deflection shield |
| (68) | vertical component |
| (70) | deflection shield edge |
| (72) | brine level |
| (74) | brine discharge control valve |
| (76) | brine discharge pipe |
| (78) | brine level detector |
| (80) | conductor |
| (82) | flange |
| (84) | wet gas inlet tube extension |
| (86) | flange |
| (88) | flange |
| (90) | flange |

Referring to the drawings and first to FIG. 1, a gas dehydration contact tower vessel is indicated by the numeral 10. The vessel 10 has a top 12, a bottom 14, a wet gas inlet tube 16, a dry gas outlet 18, and, formed in the bottom 14, a brine outlet opening 20.

Vessel 10 is supported uprightly on the earth's surface 22 by legs 24 resting on a base plate 26. The method of support of the vessel is illustrated only for the purpose of orientation and is not a part of the invention as the vessel may be of a variety of shapes and supported in a variety of ways.

Within the vessel 10 is a contact area 28 defined by a foraminous shelf 30. Through an access opening 32 in the top 12 of vessel 10 contact area 28 may receive a quantity of deliquescing salts 34, a material that is commonly known in the industry for gas dehydration. A removable cover 33 closes access opening 32 except when additional deliquescing salts 34 are being added.

Thus there is formed in vessel 10, an upper dry gas collection area 36 that is in communication with dry gas outlet 18; a contact area 28 above shelf 30 that is filled with deliquescing salts 34; a wet gas inlet area 38 below the contact area 28; and, in the lowest part of the interior of vessel 10, a brine collection area 40.

Figure 3:
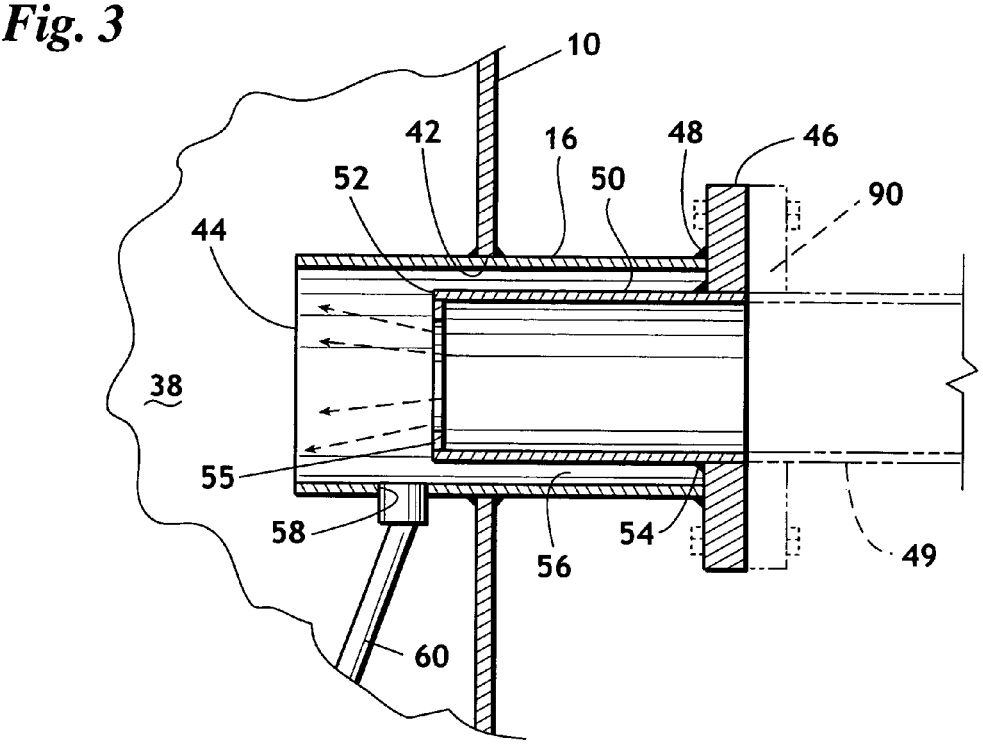
FIG. 3 is an enlarged partial cross-sectional view taken along the line 3—3 of FIG. 2, showing more details of the venturi-forming wet gas inlet.
Figure 2:
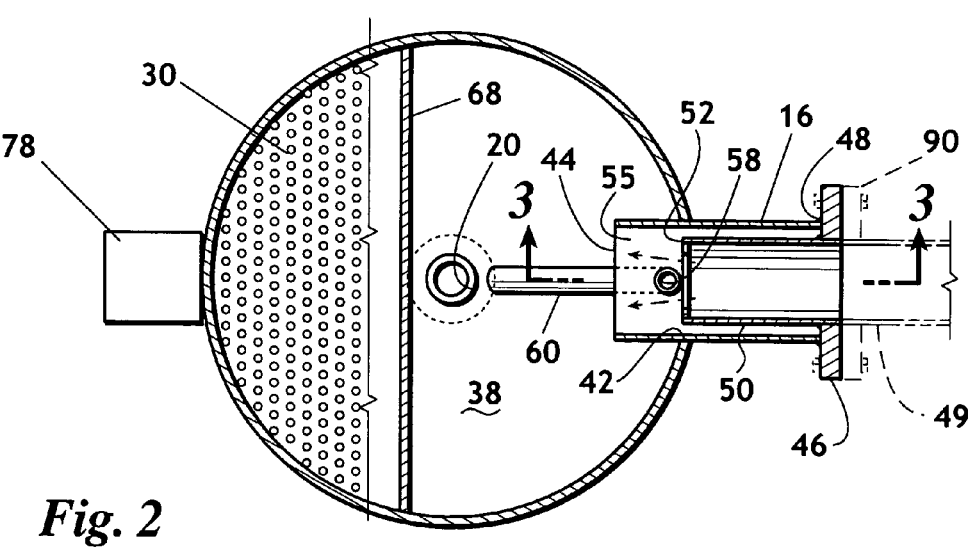
FIG. 2 is a horizontal cross-sectional view taken along the line 2—2 of FIG. 1.

An important aspect of the gas dehydration contact tower 10 is the arrangement of the wet gas inlet. Details of the wet gas inlet are shown in FIGS. 2 and 3, with alternate embodiments in FIGS. 4 and 5. A wet gas inlet tube 16 communicates with the interior of vessel 10 through a wet gas inlet opening 42, the wet gas inlet tube 16 having an outlet end 44 that is in communication with wet gas inlet area 38. A flange 46 is secured to the outer end of wet gas inlet tube 16 by a circumferential weld 48. Flange 46 is for use in attaching piping, such as piping 49 shown in dotted outline by which wet gas is delivered to vessel 10. Flange 46 normally has bolt holes therethrough (not shown) or other means by which the piping is attached.

Concentrically received within wet gas inlet tube 16 is a venturi tube 50 having an outlet end 52 that is inset with respect to the outlet end 44 of wet gas inlet 16. In the embodiment of FIGS. 1 through 3, flange 46 is welded to the outer end of gas inlet tube 16 by a circumferential weld 48 and venturi tube 50 is welded to flange 46 by a circumferential weld 54.

The diameter of venturi tube 50 is reduced compared to wet gas inlet tube 16, providing an annular area 56. An annular ring 55 is welded within the outlet end 52 of venturi tube 50 providing a reduced diameter outlet opening. This reduced diameter opening at the outlet end of tube 50 causes the velocity of wet gas passing therethrough to increase, the velocity decreasing as the inlet gas stream enters into the interior of wet gas inlet tube 16, causing a venturi effect pressure reduction. A venturi inlet opening 58 in gas inlet tube 16 receives the upper end of a siphon tube 60. The lower end 62 of siphon tube 60 extends into brine collection area 40.

As a stream of wet gas enters through venturi tube 50 and then into the larger internal diameter of wet gas inlet 16, venturi action causes reduced pressure that is coupled through venturi inlet opening 58 to siphon tube 60, thereby drawing brine solution 40 upwardly through the siphon tube and into the interior of wet gas inlet 16 where the brine contacts the wet gas stream. The wet gas and recirculated brine intimately mix in the turbulent environment of wet gas inlet area 38 causing additional water to be absorbed from the wet gas stream.

The wet gas stream entering vessel 10 is directed downwardly by a deflection shield 66 that has a vertical or at least substantially vertical component 68. The inlet gas stream moves downwardly under the deflection shield lower edge 70 and then upwardly to pass through lower shelf 30 into contact area 28. In this way, brine collected in area 40 is continually recycled by the venturi action of the wet gas inlet stream thereby absorbing water from the wet gas, diluting the brine and reducing the chances of the brine recrystallizing. Further, the water absorbed by the turbulent mixture of the recirculated brine and wet gas stream improves the efficiency of the dehydration process thereby reducing the amount of desiccant required to achieve the desired level of dehydration.

In the past, others have attempted to combat the problem of recrystallization in various ways, such as by the installation of contact media such as bubble-type trays and so forth or the use of coils to heat the brine. The present invention replaces prior devices with a self-energized recirculation system by which the brine is diluted with liquid extracted from the wet inlet gas stream.

The level 72 of brine 64 within brine collection area 40 needs to be controlled and this can be achieved by a variety of systems. One means is illustrated in which a brine discharge control valve 74 is in series with a brine discharge pipe 76 communicating with the brine outlet opening 20. A brine level detector 78 senses the height of the brine level 72 and provides a control signal by way of conductors 80 to control valve 74 and thereby maintain the brine level 72 within a pre-selected range.

The brine flowing out of the brine discharge pipe 76 is carried for disposal in an environmentally acceptable way, such as into a discharge well or (if the system is used offshore and if the brine is free of oil or other contaminants) into the ocean. Thus it can be seen that the system, method and apparatus of this invention provides a new and unique way of combating the problem of brine recrystallization that is frequently encountered in previously known dehydration systems that use deliquescing materials for absorbing moisture from a gas stream.

The system described with reference to FIGS. 1, 2 and 3 illustrates the use of a fixed venturi system in which the diameter and length of wet gas inlet 16 and venturi tube 50, as well as the specific location of venturi inlet opening 58 are established when the gas contact tower vessel is designed and built—that is, in FIGS. 1, 2 and 3, the venturi system is set and cannot be easily changed. In contrast, FIGS. 4 and 5 show alternate embodiments that permit modification of the venturi system without modification of the other features of the gas contact tower vessel.

Figure 4:
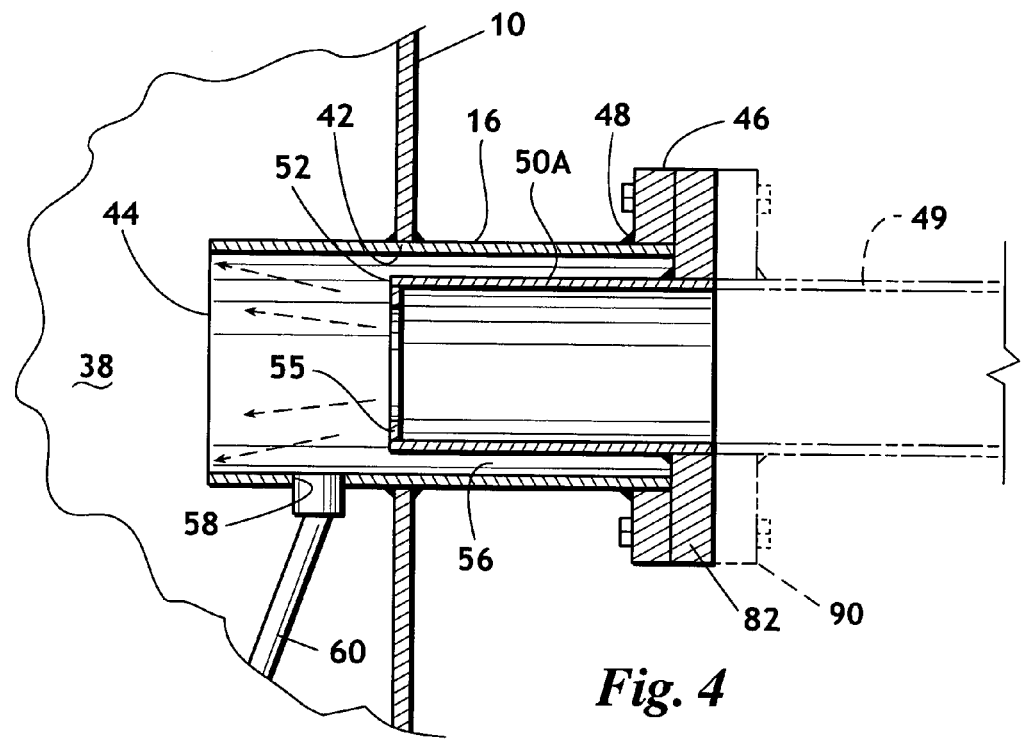
FIG. 4 is a fragmentary cross-sectional view of an alternate embodiment showing the venturi-forming portion of the wet gas inlets arranged in a way that permits easy exchange of different venturi tubes.

FIG. 4 shows an arrangement in which a venturi tube 50A has affixed at one end a flange 82 that is bolted to the exterior side of wet gas inlet tube flange 46. In this way, venturi tube 50A can be changed out without disturbing any of the other features of contact vessel 10. This permits the venturi system to be easily varied to accommodate changing conditions such as in the pressure and/or volume of the inlet gas stream.

Figure 5:
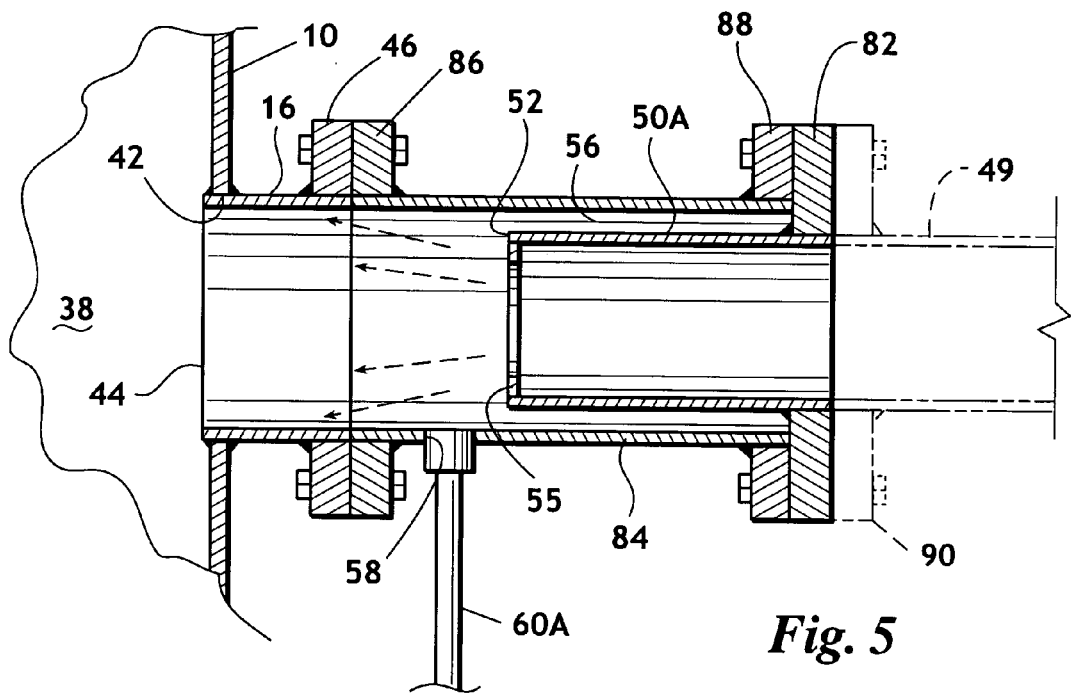
FIG. 5 is a fragmentary cross-sectional view of another alternate embodiment showing a venturi system that is completely mounted exteriorly of the contact tower so that the venturi system as a whole may easily be changed such as to accommodate different wet gas flow rates or different gas/water ratios in the wet gas stream.

FIG. 5 shows another embodiment in which all the important relationships making up the venturi system can be changed by means exteriorly of contact vessel 10. In this embodiment, a wet gas inlet tube extension 84 having flanges 86 and 88 at opposed ends is employed, flange 86 being bolted to wet gas inlet tube flange 46. Formed in wet gas tube extension 84 is a venturi tube opening 58. A modified venturi tube 50A with its attached flange 82 is secured to flange 88 at the outer end of wet gas inlet tube extension 84.

An alternate siphon tube 60A extends to communicate with brine collection area 40 which can be easily accomplished exterior of vessel 10 by connecting the siphon tube to brine discharge pipe 76 (as seen in FIG. 1) at a location between brine outlet opening 20 and brine discharge valve 74. This is a simple piping connection and not shown in the drawings.

The system of FIG. 5 permits the entire venturi system to be changed, including the position of venturi inlet opening 58 with respect to the outlet end 52 of modified venturi tube 50A, all without disturbing any of the internal features of gas contact vessel 10.

Piping 49 (shown in dotted outline in the figures) represents piping by which wet gas is brought to gas contact vessel 10. A flange 90 is shown as a means of connecting piping 49 to gas contact vessel 10. In FIGS. 4 and 5, three flanges 46, 82 and 90 are bolted together. This is by way of example only of how the piping can be arranged to conduct a wet gas stream to gas contact vessel 10. Vessel 10 may (as previously referenced) be termed a gas contact tower when it is relatively tall compared to its diameter.

Siphon tube 60 is representative of any brine flow path arrangement by which brine is channeled to the venturi system by which the brine is recirculated. In like manner, brine discharge control valve 74 is representative of any level control or flow regulatory system by which the quantity of brine 40 in the lower interior of gas contact vessel 10 is controlled or regulated.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of removing moisture from a wet gas stream comprising the steps of:

introducing the wet gas stream through a venturi into a vessel having a contact area therein containing deliquescing salts that produce brine as moisture is extracted from the wet gas stream, the vessel having a brine collection area therein;

siphoning brine from said collection area by use of said venturi whereby collected brine is recirculated in intimate contact with said wet gas stream, water absorbed from the wet gas stream serving to dilute the brine;

withdrawing dry gas from an area of said vessel above said contact area; and withdrawing brine from said brine collection area.

2. A method according to claim 1 including the step of regulating the level of brine in said brine collection area.

3. A method according to claim 1 including the step of intimately mixing the incoming wet gas stream with recycled brine in an area of turbulence formed by deflection of the wet gas stream.

4. A system for removing moisture from a wet gas stream, comprising:

a vessel having a top and bottom and having a contact area therein below said top containing deliquescing salts, the vessel further having a wet gas inlet below said contact area, a dry gas outlet above said contact area and a brine collection area adjacent the vessel bottom;

a venturi positioned within said wet gas inlet through which an inlet wet gas stream passes, producing a low pressure area, the wet gas stream passing upwardly through said deliquescing salts where water is absorbed forming brine that passes downwardly into said brine collection area;

a brine flow path from said low pressure area to said brine collection area through which brine is recirculated into intimate contact with the inlet wet gas stream and by which the brine is diluted with water extracted from the wet gas stream; and a system to regulate brine level within said vessel brine collection area.

5. A system for removing moisture from a wet gas stream according to claim 4 wherein the wet gas stream enters said vessel through a wet gas inlet pipe and wherein said venturi is formed by a short length, reduced diameter pipe axially positioned within said wet gas inlet pipe and through which said wet gas stream enters said vessel providing said low pressure area.

6. A system for removing moisture from a wet gas stream according to claim 5 including an inlet opening in said wet gas inlet pipe communicating with said low pressure area, said brine flow path having an upper end connected to said inlet opening and a lower end in communication with said brine collection area.

7. A system for removing moisture from a wet gas stream according to claim 4 wherein said system to regulate brine level includes a liquid level device providing a control signal output in response to said brine level and a valve in series with a brine outlet that is controlled by said control signal.

8. A system for removing moisture from a wet gas stream according to claim 4 wherein said contact area is defined by a foraminous shelf supporting said deliquescing salts thereon.

9. A system for removing moisture from a wet gas stream according to claim 4 including a flow deflector within said vessel and in a flow path of said wet gas stream to increase turbulence of the wet gas stream and to deflect the inlet flow of wet gas in a downward direction.

10. A system for removing moisture from a wet gas stream according to claim 4 including a baffle positioned within said vessel below said contact area that intercepts said incoming wet gas and recirculated brine and that is configured to provide an area of turbulence by which the wet gas stream and recycled brine are intimately mixed.

11. A gas dehydration contact tower comprising:

an upright vessel having a top and bottom and having in an upper interior portion of the vessel a foraminous shelf that retains deliquescing salts thereabove, the vessel further having a dry gas outlet above said shelf and a brine collection area in a lower interior portion thereof;

a venturi forming wet gas inlet in communication with interior portion of said vessel below said shelf; and a brine flow path extending from said venturi forming inlet to said brine collection area by which brine is recycled and intimately mixed with the incoming wet gas stream, absorbed water serving to dilute the brine, and the wet gas stream passing upwardly through said deliquescing salts by which water is absorbed, forming brine that passes downwardly into said brine collection area.

* * * * *